United States Patent
Raikar

(12) 
(10) Patent No.: US 8,908,708 B2
(45) Date of Patent: Dec. 9, 2014

(54) SECURE METHOD AND APPARATUS FOR ENABLING THE PROVISIONING OF A SHARED SERVICE IN A UTILITY COMPUTING ENVIRONMENT

(75) Inventor: Amit Raikar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1812 days.

(21) Appl. No.: 11/262,434

(22) Filed: Oct. 28, 2005

(65) Prior Publication Data

US 2007/0097998 A1 May 3, 2007

(51) Int. Cl.
*H04L 12/28* (2006.01)
*H04L 29/06* (2006.01)
*H04L 12/46* (2006.01)

(52) U.S. Cl.
CPC .......... *H04L 63/0272* (2013.01); *H04L 12/467* (2013.01)
USPC .......................................................... 370/409

(58) Field of Classification Search
USPC .................. 709/200, 226, 219, 229; 713/153; 370/409
See application file for complete search history.

(56) References Cited

U.S. PATENT DOCUMENTS

| | | | |
|---|---|---|---|
| 6,880,089 B1* | 4/2005 | Bommareddy et al. | 726/11 |
| 7,055,173 B1* | 5/2006 | Chaganty et al. | 726/11 |
| 7,349,965 B1* | 3/2008 | Graupner et al. | 709/226 |
| 2005/0283822 A1* | 12/2005 | Appleby et al. | 726/1 |
| 2006/0107036 A1* | 5/2006 | Randle et al. | 713/153 |
| 2006/0146835 A1* | 7/2006 | Homchaudhuri et al. | 370/395.53 |

* cited by examiner

*Primary Examiner* — Wei Zhao

(57) ABSTRACT

Embodiments of the invention provide a secure method for enabling the provisioning of a shared service in a utility computing environment. One embodiment establishes an account primary virtual local area network (VLAN) for at least one account in a utility computing environment. Then, a request is received from a service provider to provide a shared service to the at least one account. An isolated VLAN is established for each shared service being provisioned in the context of the account primary VLAN and a promiscuous port is provided for the service provider. A selection option is then provided to allow the at least one server to utilize the shared service provided by the service provider. An isolated port is then configured for the at least one server on an isolated VLAN between the at least one server that chooses to utilize the shared service, and the shared service.

26 Claims, 5 Drawing Sheets

SECURE METHOD AND APPARATUS FOR ENABLING THE PROVISIONING OF A SHARED SERVICE IN A UTILITY COMPUTING ENVIRONMENT

TECHNICAL FIELD

The present invention generally relates to utility computing environments. More specifically to a system and method for enabling the provisioning of a shared service in a utility computing environment.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems, switches, routers, load balancers, firewalls, and the like.

In one embodiment, a LAN is established and/or managed by having a technician physically connecting devices according to a network plan. That is, when a plurality of resources is to be used in a network, the technician will connect the devices physically and install the correct software into the devices by hand. Each time a modification to the network or software is necessary, the technicians must manually connect or disconnect the devices or manually install or change the software to perform the modification.

To resolve the manual modification process, many modern networks also have in-house data centers which include technicians working from a network operation center (NOC). The technicians issue commands to control the deployment of servers and to control the supporting infrastructures, such as disk logical units (LUNs) in a disk array, network switches in the LAN, and the like. For example, a technician in the NOC may organize a virtual LAN (VLAN) including a plurality of the resources within the LAN network. In general, the network is referred to as a VLAN because the actual network (e.g., the wiring, cables, etc.) is not reconfigured, instead, the technicians in the NOC will virtually assign (e.g., with the use of software) the components specific to the VLAN. Thus, the physical network remains the same, but the actual utilization of the network can be divided into distinct LANs virtually.

In present VLAN environments, like most other complex IT environments, security is paramount for the VLAN. Therefore, the access to the VLAN is extremely limited. In other words, while a plurality of servers and other provisionable resources are utilized within the VLAN, only the management server can provide any services to the resources within the VLAN. For example, for a server to utilize an application or a service within the VLAN, the management server must provide the service. Moreover, if the management server provides the service to one resource within the VLAN, every resource within the VLAN is provided access to the service and charged accordingly. Regardless of whether or not the resource used the provided service.

In addition to providing the service to every resource within the VLAN regardless of utilization, present IT environments also require the provided services to be established during the actual "wiring" or construction of the network. That is, the services utilize a specialized network interface card (NIC) which is pre-wired to a central top tier switch such that when the service is required to be used by a specific provisioned resource, the specialized NIC can dynamically join the VLAN within which the specific provisioned resource resides. Limitations to the server providing the service are also constrained by the number of IP addresses that the specialized NIC can manage.

In other words, not only is the service provided by a server/switch port specific physical wiring customization, but also none of the provisioned resources within the VLAN (or other resources outside of the VLAN) is allowed to provide services to any of the other resources within the VLAN. Therefore, even if a VLAN user has a server with a desired service thereon, the user is not capable of sharing the service even with other resources within the VLAN controlled by the same user. This limitation is extremely deleterious during operations wherein the VLAN would benefit from having a resource within or outside of the network acting as a backup or high availability (HA) resource for seamless operation during failure of a critical resource within the VLAN fabric.

DISCLOSURE OF THE INVENTION

Embodiments of the invention provide a secure method for enabling the provisioning of a shared service in a utility computing environment. One embodiment establishes an account primary virtual local area network (VLAN) for at least one account in a utility computing environment. Then, a request is received from a service provider to provide a shared service to the at least one account. An isolated VLAN is established for each shared service being provisioned in the context of the account primary VLAN and a promiscuous port is provided for the service provider. A selection option is then provided to allow the at least one server to utilize the shared service provided by the service provider. An isolated port is then configured for the at least one server on an isolated VLAN between the at least one server that chooses to utilize the shared service, and the shared service. In other embodiments, the invention supports the service to be provisioned with high availability or load balancing resource topology.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
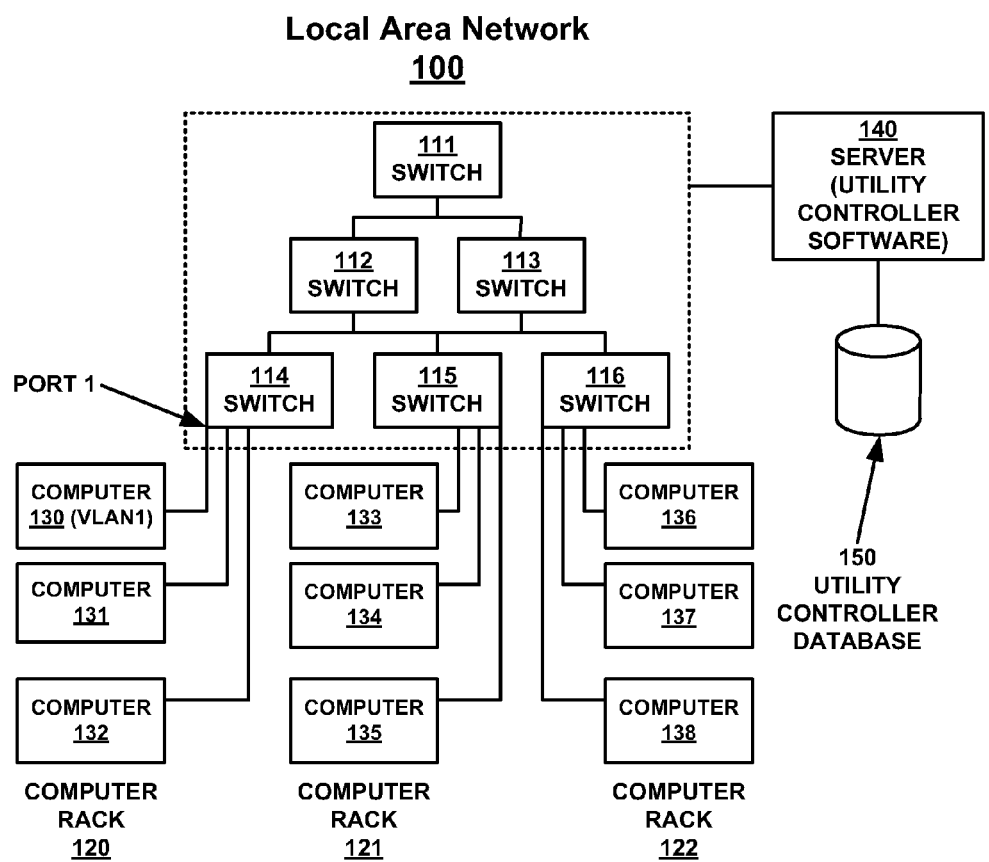
FIG. 1 is a block diagram of an exemplary LAN upon which embodiments of the present invention can be implemented.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. RAM, ROM and a data storage device are examples of a computer-usable medium having computer-readable code stored thereon for causing a method, according to various embodiments, to be executed by a processor.

Overview

Embodiments of the present invention provide a virtual framework for enabling the provisioning of shared services in a utility computing environment. In one embodiment, data link layer/layer 2 (e.g., switch) access control technology (e.g., private virtual local area network (PVLAN) technology) is utilized to implement the virtual framework in a secure manner. In general, the framework allows any virtually provisioned resource or external resource to be deployed as a service provider to other resources (e.g., virtually provisioned or external) within an established primary VLAN. In one embodiment, the framework additionally supports utility billing of the service usage. That is, instead of every resource within the VLAN paying for each service provided by the management server regardless of utilization, the present framework allows selective usage of provided services and therefore selective billing for the services utilized.

Presently, numerous utility computing environments exist, one of those, for example, is the utility data center (UDC) available from Hewlett-Packard of Palo Alto, Calif. Although such a specific implementation will be mentioned herein, it should be understood that embodiments of the present invention are also well suited to use with various other utility computing environments. The present description begins with an overview of such an environment. The details for enabling the provisioning of a shared service in a utility computing environment are then described in further detail.

With reference now to FIG. 1, a block diagram of an exemplary local area network (LAN) 100 is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein.

Although a LAN is described herein, embodiments of the present invention are well suited for utilization with other types of networks. For example, in one embodiment, the utility computing environment includes a storage array. In another embodiment, the utility computing environment also includes a storage area network (SAN). In yet another embodiment, the utility computing environment includes a LAN, a SAN and a storage array. The present FIG. 1 is merely one of a plurality of possible network configurations that are within the scope of the utility computing environment shown for purposes of clarity.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, a network map is also available. In general, the network map may include information such as the types of devices in the LAN and a representation of each VLAN. Other information included in a network map includes, but is not limited to: the network or MAC (media access control) address for the resources of the LAN; the port numbers of the configurable devices; the VLAN identifiers associated with each of the port numbers; the socket identifier for each cable connected to each of the resources of LAN; manufacturer and model numbers; and serial numbers. The network map, according to one embodiment, is also referred to as a machine-readable map.

Figure 2:
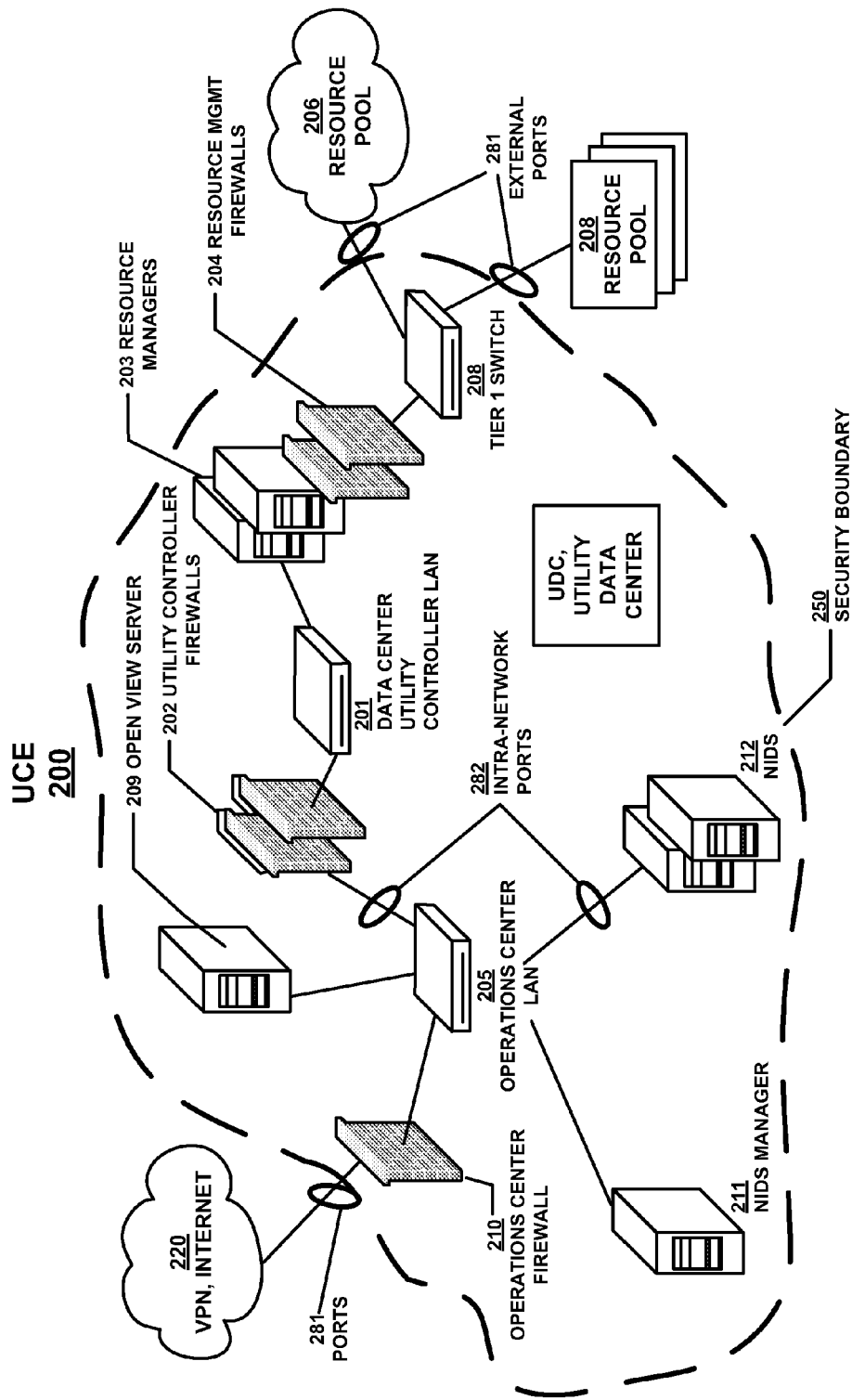
FIG. 2 is a block diagram of an exemplary utility computing environment in which embodiments of the present invention can be implemented.

With reference now to FIG. 2, an exemplary provisionable network in which embodiments of the present invention can function is shown. Provisional network, or utility computing environment (UCE), 200 is shown bounded by a security boundary 250. In one embodiment, security boundary 250 is a virtual boundary. Boundary 250 is shown here only to help illuminate the concepts presented herein. Typical UCE 200 comprises an operations center local area network (LAN) 205, a data center utility controller LAN 201 and resource pools 206. It is noted here that, by their very nature, UCEs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UCE 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility computing environment 200 may include devices and servers located remotely from the other elements of the UCE. The resources of the UCE include at least one hardware resource, according to one embodiment.

As shown in FIG. 2, operations center (OC) LAN 205 comprises an internal trust domain. Included in OC LAN 205 are open view servers 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility computing environment illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UCE concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted that embodiments of the present invention can run in many different environments. One network management environment in which an embodiment operates serves as an end-to-end service management infrastructure and is particularly well suited to managing a provisionable network which is known as a utility data center (UDC).

In one embodiment, the UCE maintains a list of each individual network device and the attributes of the device. For example, the attributes of a device may include, but are not limited to, the make, model, type, role, and unique identifier of the device. Additionally, the UCE may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable.

Figure 3:
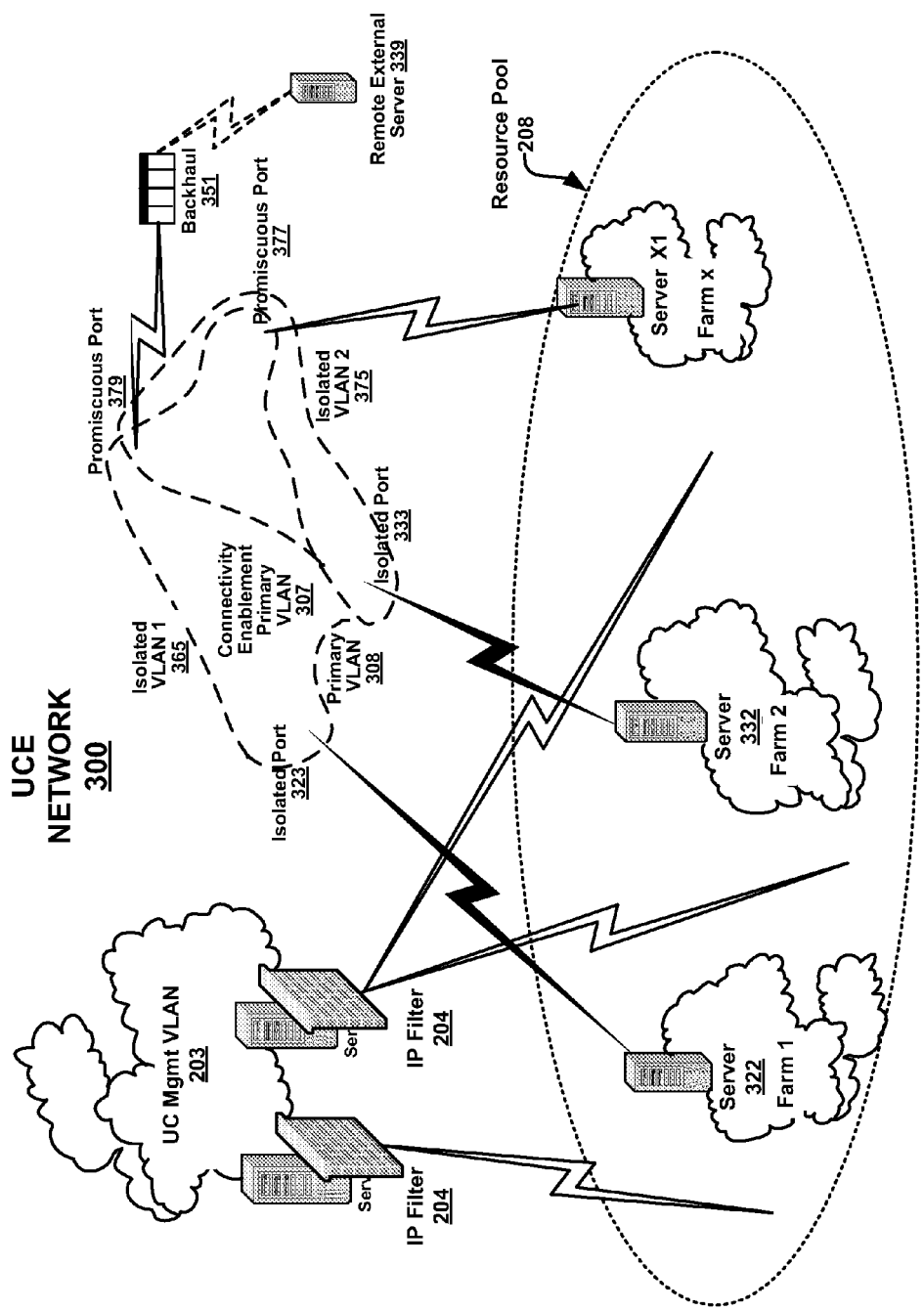
FIG. 3 is a block diagram of an exemplary portion of a utility computing environment having provisionable-shared services in accordance with one embodiment of the present invention.

With reference now to FIG. 3, a block diagram of an exemplary portion of a utility computing environment having provisionable-shared services is shown in accordance with one embodiment of the present invention. In one embodiment, UCE network 300 includes a resource manager 203, which in one embodiment is a management VLAN having a plurality of resources therein including IP Filter 204.

In addition, UCE network 300 also includes a connectivity enablement primary VLAN 307, along with two isolated VLANs 365 and 375. In general, UCE network 300 includes a plurality of elements such as racks, routers, cables, switches and other elements that are well known in the art such as those shown in FIG. 1. Network 300 also includes a plurality of resources (e.g., resources of farm 1, 2 and x) in a resource pool 208. In one embodiment, resource pool 208 is divided into a plurality of VLANs or virtual farms such as farms 1, 2 and x, wherein each farm include servers (e.g., server 322, 332 and x1), disk arrays, and the like.

In one embodiment, the primary VLAN 307 carries traffic from promiscuous ports (e.g., 377 and 379) to isolated ports (e.g., 323 and 333), community ports, and other promiscuous ports (e.g., 377 and 379). While the isolated VLAN carries traffic from isolated ports to promiscuous ports and the community VLAN carries traffic between community ports and to promiscuous ports.

In one embodiment, the LANs of UCE network 300 includes a number of connections coupled to a number of computing devices in a similar fashion to that of FIG. 1. Typically, the computing devices 322, 332 and x are connected with the primary VLAN 307 using cables or the like. However, wireless connections between the computing devices 322, 332 and x and primary VLAN 307 are also contemplated.

In one embodiment, the connections are connected to switches such as the switches 111-116 of FIG. 1. In general, the switches are capable of being programmed or configured such that UCE network 300 is logically separated into a number of VLANs or farms (e.g., primary VLAN 307, management VLAN 203, isolated VLAN 365 and 375, farms 1, 2 and x). The programming or configuring of these switches can be changed, thereby changing the resources allocated to the various VLANs. For example, by changing the configuration of a switch, server 322 can be "virtually moved" from one VLAN (e.g., farm 1) to another VLAN (e.g., farm 2). The allocation and reallocation of resources between farms is dynamic and is one of the valuable operations performed after the actual physical building of the network structure in a utility computing environment.

In addition to computer systems and switches, UCE network 300 and the plurality of VLAN's therein can include other types of devices such as, but not limited to, routers, load balancers, firewalls, and hubs. These other types of devices may also be programmable or configurable.

In one embodiment, UCE network 300 also includes a plurality of ports, e.g., promiscuous ports and isolated ports as well as a Backhaul 351 and remote external servers such as server 339. Although only a single remote external server is shown, it is understood that the number of remote external servers is not limited by the present invention.

In general, promiscuous port (e.g., 377 and 379) is a port that can communicate with all interfaces, including the isolated ports (e.g., 323 and 333) and community ports. In one embodiment, a promiscuous port can serve only one primary VLAN 307, but can serve as many isolated VLANs (e.g., 365 and 375) or community VLANs (used in another embodiment to support high availability) as needed. Isolated ports on the other hand are ports that have complete layer 2 separation from the other ports within the same primary VLAN (e.g., 307), but not with the promiscuous ports (e.g., 379 and 377). That is, in one embodiment, all traffic to isolated ports (e.g., 323 and 333) is blocked except for traffic originating from promiscuous ports. In addition, traffic from an isolated port is forwarded only to promiscuous ports. Although private VLAN technology is implemented in one embodiment of the present invention, the same type of access control and layout can be enforced using equivalent data link layer/layer 2 technology.

Operation

Figure 4:
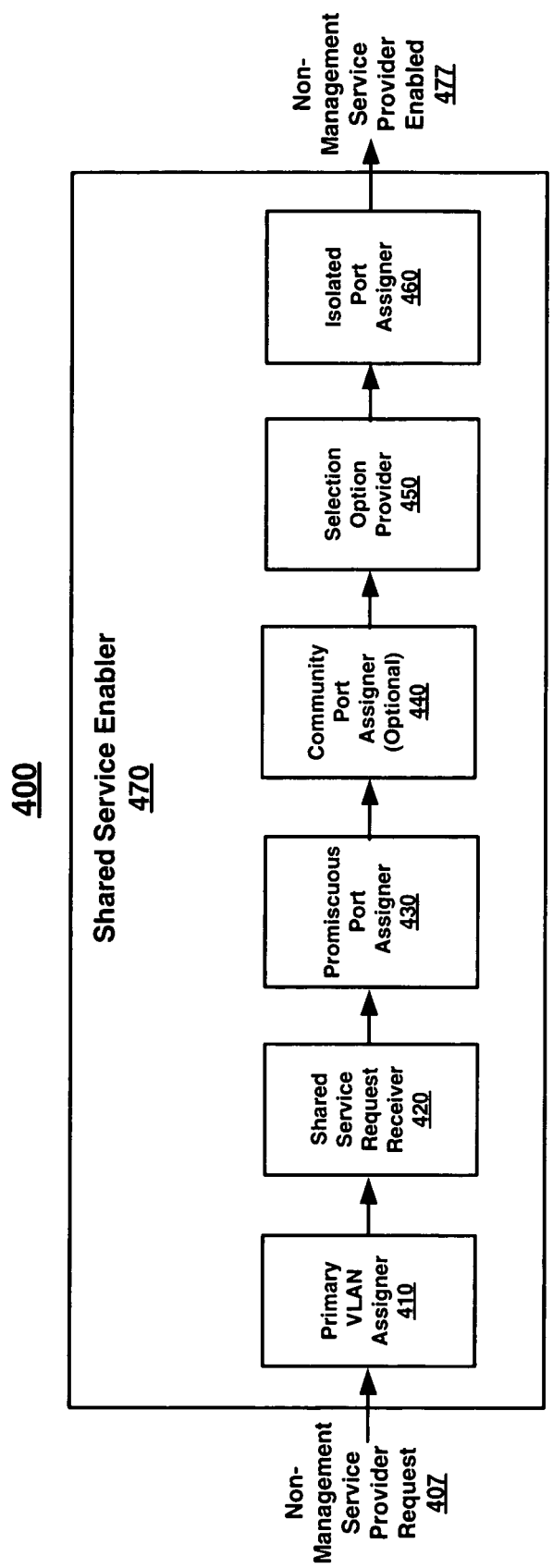
FIG. 4 is a block diagram of an exemplary shared service enabler in accordance with one embodiment of the present invention.

With reference now to FIG. 4, a block diagram of an exemplary shared service enabler is shown in accordance with one embodiment of the present invention. In one embodiment, the exemplary shared service enabler 470 includes a primary VLAN assigner 410, a shared service request receiver 420, a promiscuous port assigner 430, an optional community port assigner 440, a selection option provider 450, and an isolated port assigner 460.

Referring still to FIG. 4 and now to FIG. 3, in one embodiment, the primary VLAN assigner 410 is used to setup a connectivity enablement primary Virtual Local Area Network (VLAN) 307 for every new account setup. This serves as the base environment in which the shared service is enabled for that specific account using layer 2 access control technologies. The shared service request receiver 420 is utilized for receiving a request from a service provider (e.g., such as server x1) to provide a shared service in a primary VLAN 307 of a utility computing environment 300. The promiscuous port assigner 430 is utilized for setting up an isolated VLAN for each service and then assigning a promiscuous port (e.g., 377) for the service provider (e.g., server x1) on both the isolated (e.g., 375 and/or 365) and primary VLANs. The optional community port assigner 440 is utilized for certain embodiments, when the service provider has to be provisioned in a high availability topology. The assigner sets up a community VLAN. The ports that are meant for heart-beat polling each other in a high availability configuration of the service provider resource are configured as community ports on both the isolated VLAN (e.g., 375 and 365 for 2 different services) and community VLAN, while the active and standby ports that would be used for providing the actual service are configured as promiscuous ports on both the VLAN types.

In one embodiment, the selection option provider 450 provides a selection option for at least one server (e.g., server 322 and/or 332) from the account to which the primary VLAN 307 is associated, the selection option is provided to allow at least one server (e.g., server 322 and/or 332) to select the shared service of the service provider (e.g., server x1). In one embodiment, the isolated VLAN assigner 460 is utilized for assigning an isolated VLAN port on the isolated VLAN setup for the specific service (e.g., 375 and/or 365) for the at least one server (e.g., server 322 and/or 332) when the server (e.g., server 322 and/or 332) selects the shared service. In one embodiment, the at least one server (e.g., server 322 and/or 332) utilizes an isolated port (e.g., port 333 and/or 323) on the isolated VLAN (e.g., 365 and/or 375) for contacting the shared service. Further operation of each of the components is provided in more detail herein.

In general, shared service enabler 470 provides an automated method for provisioning shared services in a utility computing environment such as the UDC of FIG. 2. Embodiments further provide a framework that utilizes layer 2 (e.g., switch layer) access control technologies to implement the virtual framework in a secure manner. Moreover, embodiments of the framework allow a virtually provisioned resource or external resource to be deployed as a service and shared securely to other resources within an account context. That is, whether the other resources utilizing the service are virtually provisioned or external resources. The framework additionally supports utility billing of service usage instead of a flat rate fee for services provided whether utilized or not.

In operation, utility computing environment resource provisioning is performed in a phased manner. Initially resources and disks are allocated, then disk binding to resources (SAN setup), resource wiring (network VLAN setup), and finally configuring resources for domain name system (DNS), dynamic host configuration protocol (DHCP), and other services that are later utilized to manage the resource. The resource wiring phase not only includes setting up of the resource network but also the setup of a management interface onto every managed resource subnet, via which the management VLAN (e.g. 203 of FIG. 3) can provision and manage the resources (e.g., the resources of resource pool 208 of FIG. 3).

In addition, during the wiring setup one or more of the ports for every virtual resource (either within the utility computing environment 300 or outside via the backhaul 351) are kept dedicated for this framework. That is, in one embodiment, the wiring is performed in a manner such that all the ports within the network 300 are capable of being mapped to one common VLAN (e.g., the connectivity enablement primary VLAN 307). Furthermore, in one embodiment, the ports are selected of appropriate bandwidth keeping in mind future usage scenarios (e.g., 1 Gig, 100 Mbps, or the like). Moreover, the wiring scheme is designed for performance and fail over requirements correlating to the utility computing environment standards. In addition, in one embodiment, the data about the wiring done for the framework is mapped in the utility computing logic (e.g., database), and the ports are dedicated for the service enablement only.

Figure 5:
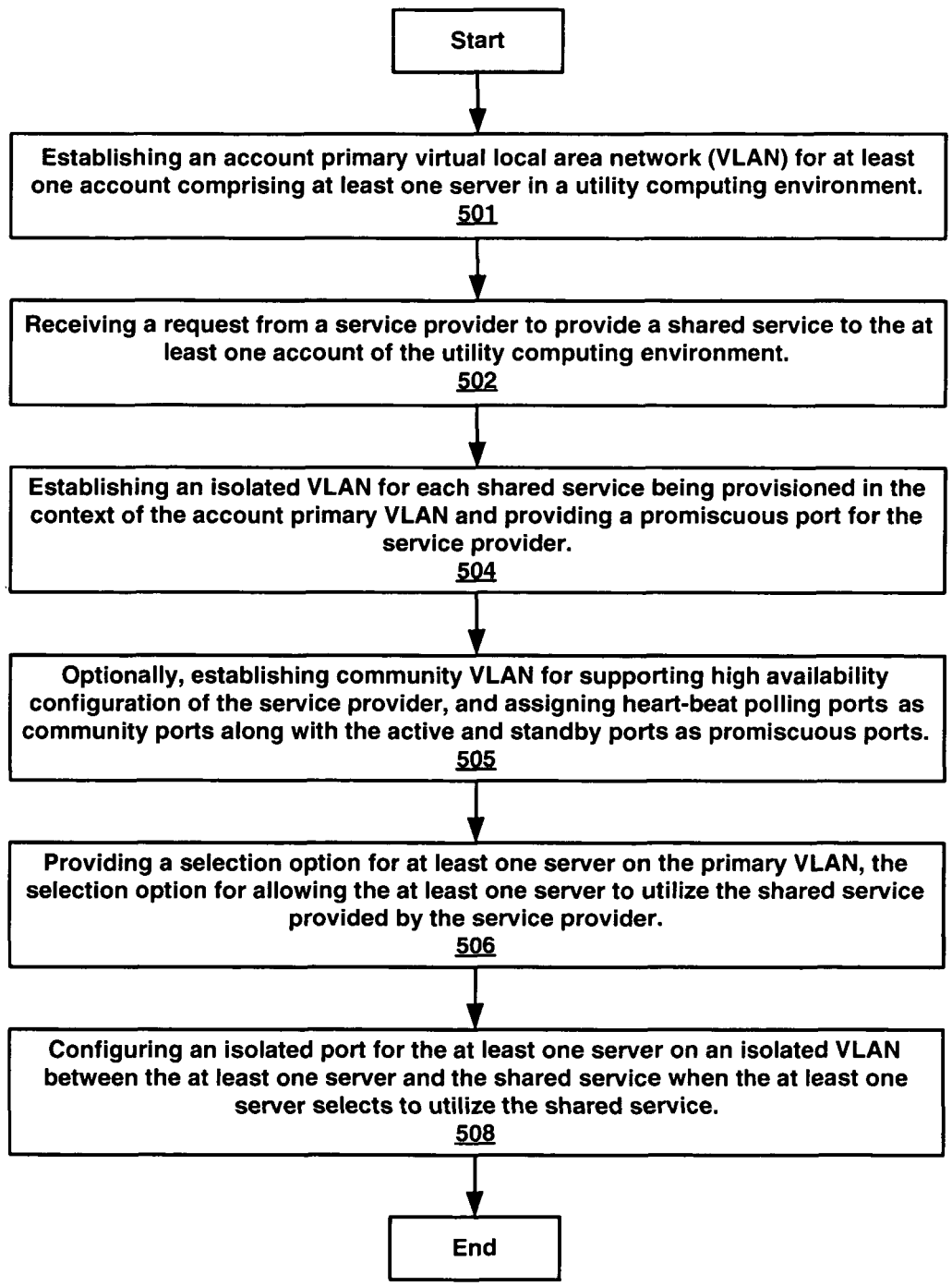
FIG. 5 is a flowchart of a method for enabling the provisioning of a shared service in a utility computing environment in accordance with one embodiment of the present invention.

Referring now to FIG. 5, a flowchart of a method for enabling the provisioning of a shared service in a utility computing environment is shown in accordance with one embodiment of the present invention. One embodiment of method for enabling the provisioning of a shared service utilizes a six-phase framework. In general, the six phases include the initial setup associated with the account setup, the provisioning of services, setup for high availability support, setting of service constraints (to support utility billing) which are described in more detail herein, and finally enablement of service consumption by resources choosing to utilize service. Although a six-phase framework is described herein, embodiments of the present invention are well suited to frameworks having more or fewer phases (for example the phase for supporting high availability is optional and requirements driven).

With reference now to step 501 of FIG. 5, and to FIG. 3, one embodiment establishes an account primary virtual local area network (VLAN) for at least one account comprising at least one server in a utility computing environment. For example, a primary VLAN 307 based connectivity enablement environment is setup when a utility computing account is setup.

This setup provides the base environment for enabling the layer 2 access control configurations required for service provisioning within the account domain context.

With reference now to step 502 of FIG. 5, and to FIG. 3, one embodiment receives a request from a service provider (e.g., server x1 or remote external server 339) to provide a shared service to the at least one account of a utility computing environment (e.g., in a primary virtual local area network (VLAN) 307). For example, the owner of the virtual resource (e.g., server x1) will specify an intention to provide a shared service to the network (e.g., primary VLAN 307) with the management VLAN resource managers 203. In one embodiment, the request is passed to the resource managers 203 via the utility computing interface.

With reference now to step 504 of FIG. 5, and to FIG. 3, one embodiment establishes an isolated VLAN for each shared service being provisioned in the context of the account primary VLAN and provides a promiscuous port for the service provider. In one embodiment, the promiscuous port is provided on the primary VLAN 307 and the isolated VLAN (e.g. isolated VLANs 365 and 375). In one embodiment, the request to provide a shared service proceeds as a utility lifecycle computing request. That is, after the owner of the virtual resource specifies an intention to provide a shared service to the network 300, the resource managers establish an isolated VLAN (e.g., Isolated VLAN 365 and/or 375) between the farms of the resource pool 208 within the virtual resource primary VLAN 307 and the service provider (e.g., server x1). During the establishment of the isolated VLAN(s), the port of the resource dedicated for this framework (e.g., the service provider such as server x1 or remote external server 339) is enabled as a promiscuous port on the isolated VLAN (e.g., 365 and/or 375). In addition, the service provider port is also enabled as a promiscuous port on the primary VLAN 307 to which the resource belongs. In one embodiment, for example in the case of multiple resources being provisioned for the same service (e.g., for load balancing, back-up and the like), the ports for each of the multiple resources being provisioned are also provisioned as promiscuous ports for both the isolated VLAN and the primary VLAN.

With reference now to step 505 of FIG. 5, and to FIG. 3, in one optional embodiment, if multiple resources are required to be provisioned to meet High Availability (HA) requirements for a specific service, a community VLAN is set up for the specific HA service configuration. In so doing, ports that are meant for heart-beat polling, e.g., to ensure primary service provider is operational, are configured as community ports on the isolated and community VLANs, while the active and standby ports that would be used for providing the actual service are configured as promiscuous ports on the isolated and community VLANs.

Referring now to step 506 of FIG. 5 and to FIG. 3, one embodiment provides a selection option for the at least one server on the primary VLAN, the selection option for allowing the at least one server to utilize the shared service provided by the service provider. That is, in one embodiment, once the configurations of step 504 are performed, the owner of the provisioned resource (e.g., server x and/or remote external server 339) is able to specify the context of the shared service. In one embodiment, the context of the shared service includes what service or services the shared service will provide, any restrictions such as which farms within the primary VLAN 307 are allowed to utilize the shared resource.

Once the context of the shared service is established, the context is then mapped into the menu choices provided to each farm that is authorized to use the service. Therefore, for each service being offered to the primary VLAN 307, the resource manager (or owner) for the farms within the network 300 would be able to select the enablement or disablement of any of the services being provided to his particular primary VLAN 307. By providing each farm, or resource therein, the option to select the services provided by the service provider, control is retained on both sides of the shared service protocol.

For example, the service provider (e.g., server x1 and/or remote external server 339) retains control of specifying the resources to which it will provide service. At the same time, the service user (e.g., the resources of farms 1 and 2) retains control of specifying whether or not the service is enabled. This control is even more relevant in a utility billing scheme for services. That is, the control allows the resource user to be charged on a service usage basis. In addition, the control allows the service provider to receive payment based on actual service usage versus flat rate payment for providing a service whether or not it is used.

With reference now to step 508 of FIG. 5 and to FIG. 3, one embodiment configures an isolated ports for the at least one server on an isolated VLAN between the at least one server and the shared service when the at least one server selects to utilize the shared service. That is, one embodiment establishes for the at least one server selects to utilize the shared service an isolated port on the isolated VLAN (e.g., isolated VLAN 365 and 375) between the at least one server (e.g., server 322 or 332) and the shared service (e.g., server x1) For example, when a select subset (e.g., farm 1 or farm 2) of the provisioned resources 208 have selected the use of the shared service (e.g., server x1) and the shared service has verified that the select subset is authorized to utilize the shared service, a modification to the primary VLAN 307 is performed. In one embodiment, an isolated port is configured for the provisioned resources 208 that have chosen to utilize the service, on the isolated VLAN established for the specific service.

For example, when server 322 of farm 1 selects to use the service provided by server x1, an isolated VLAN 365 is established between farm 1 and farm x. Additionally, when server 332 of farm 2 selects to use the service provided by server x1, an isolated VLAN 375 is established between farm 2 and farm x. Therefore, although both farms 1 and 2 are utilizing the service provided by server x, farm 2 is still isolated from farm 1 thereby providing a level of security between farm 1 and farm 2 interaction. In addition to establishing isolated VLANs between the farms utilizing the service and the service provider, the ports of the resources dedicated for this framework, e.g., the ports for service receiving servers 322 and/or 332, are enabled as isolated ports (e.g., isolated ports 323 and 333). In one embodiment, the utility database is also updated with information about resources using the provisioned service.

By enabling the provisioning of shared services in the utility computing environment, e.g., by allowing a provisioned resource or an external resource to provide a service, the concept of resource provisioning to service provisioning is extended in a virtual manner without compromising the security of the virtual networks. In addition, the enabling of shared services does not require specialized servers to be used. That is, the framework does not require strict wiring constraints or the usage of specialized virtual network interface card (NIC) devices. Thus, embodiments allow almost any of the provisioned resources within the utility computing environment to be enabled for providing or using the service.

Moreover, within the framework described herein, the shared service can be enabled at any time. In other words, the service core does not need to be built with the intent of supporting a specified number of services. The services that are provided to the network can be provisioned in the same manner that a server or other device is provisioned within the network. By enabling real time enablement of the service being provided, the usage of the service can be billed in a pay as you go manner instead of utilizing a pay whether or not, or how often, the service is used.

The framework for provisioning shared services also provides support for remote servers to provide shared services via Backhaul. In general, Backhaul is a terminating point for extensivity. Also, by providing a resource the option of utilizing or not utilizing a service, account-wide trust requirements are met. That is, if a first resource does not trust a second resource providing a service, the first resource can simply select not to utilize the service.

In addition to providing trust requirements, the framework also supports future separate layer 2 fabric setup as it does not require strict wiring requirements. That is, the addition of back-up performance, HA, and the like are easily integrated into the VLAN fabric. Moreover, the integration of resources into the VLAN fabric does not depend on tight integration with external logic (e.g., private VLAN setup at the network layer). Therefore, no extension of trust or complexity is required. Additionally, the present framework results in a one-time consumption of one IP subnet space per account (e.g., the first time a service is provisioned within an account). In other words, the server providing the service does not need to use more than a single IP address for that service interface. In so doing, the number of resources that can access the server providing the service is not artificially limited based on available IP addresses such as the limitations seen in virtual NIC access frameworks.

Thus, embodiments of the present invention provide methods and systems for enabling the provisioning of a shared service in a utility computing environment. Furthermore, embodiments provide a method for enabling the provisioning of a shared service in a utility computing environment which enables any provisioned server to be used for provisioning a service. Embodiments also provide a framework wherein external servers are enabled to provide services to resources within the utility computing environment in a virtual manner. Embodiments further provide support for utility computing environment features such as High Availability, load balancing, and the like while enabling the virtual provisioning of the services.

Embodiments of the present invention are thus described. While the present invention has been described in particular embodiments, it should be appreciated that the present invention should not be construed as limited by such embodiments, but rather construed according to the following claims.

I claim:

1. A secure method for enabling provisioning of a shared service in a utility computing environment comprising:
   establishing an account primary virtual local area network (VLAN) for at least one account comprising at least one server in the utility computing environment;
   receiving a request from a service provider to provide a shared service to said at least one account of said utility computing environment;
   establishing an isolated VLAN for each shared service being provisioned in the context of the account primary VLAN and providing a promiscuous port for said service provider;
   providing a selection option for at least one server on said primary VLAN, said selection option for allowing said at least one server to utilize the shared service provided by said service provider; and
   configuring an isolated port for said at least one server on an isolated VLAN between said at least one server and said shared service when said at least one server selects to utilize said shared service.

2. The method of claim 1 further comprising:
   establishing a community VLAN and configuring heartbeat polling ports as community ports, along with active-standby ports as promiscuous ports for supporting high availability topology of said service provider.

3. The method of claim 1 comprising:
   utilizing an external server as said service provider.

4. The method of claim 1 comprising:
   utilizing a provisioned resource of said utility computing environment as said service provider.

5. The method of claim 1 further comprising:
   utilizing said shared service via an external server.

6. The method of claim 1 further comprising:
   utilizing said shared service via a provisioned resource of said utility computing environment.

7. The method of claim 6 wherein said isolated port comprises:
   providing a complete layer 2 separation from other isolated ports within the same said isolated VLAN; and
   providing complete layer 2 connectivity to any said promiscuous ports within the same said isolated VLAN.

8. The method of claim 1 further comprising:
   utilizing said primary VLAN for carrying traffic from promiscuous ports to all other ports in the VLAN.

9. The method of claim 1 further comprising:
   serving a plurality of isolated VLANs via said promiscuous port.

10. The method of claim 1 wherein said isolated VLAN further comprises:
    carrying traffic from said at least one server utilizing an isolated port to said shared service utilizing said promiscuous port.

11. The method of claim 1 further comprising:
    blocking all traffic to said isolated port except for traffic originating from said promiscuous port.

12. A shared service enabler for a utility computing environment comprising:
    a primary virtual local area network (VLAN) assigner for establishing a primary virtual local area network (VLAN) for at least one account of a utility computing environment;
    a shared service request receiver for receiving a request from a service provider to provide a shared service for said at least one account of said utility computing environment;
    a promiscuous port assigner for establishing an isolated VLAN for said shared service and assigning a promiscuous port for said service provider;
    a selection option provider for providing a selection option for at least one server, said selection option for allowing said at least one server to select the shared service of said service provider; and
    an isolated VLAN assigner for assigning an isolated port on the said isolated VLAN for said at least one server when said at least one server selects said shared service, wherein said at least one server utilizes said isolated port on said isolated VLAN for contacting said shared service.

13. The shared service enabler of claim 12 further comprising:
    a community port assigner for supporting high availability (HA) topology of service provider, by establishing a community VLAN and assigning community ports to heart-beat polling ports of HA configured service provider along with promiscuous ports to active-standby ports.

14. The shared service enabler of claim 12 wherein said service provider is an external server.

15. The shared service enabler of claim 12 wherein said service provider is a provisioned resource of said utility computing environment.

16. The method of claim 12 wherein said server utilizing said service is an external server.

17. The method of claim 12 wherein said server utilizing said service is a provisioned resource of said utility computing environment.

18. The shared service enabler of claim 12 wherein said primary VLAN is utilized for carrying traffic from promiscuous ports to a plurality of other ports in the VLAN.

19. The shared service enabler of claim 12 wherein said isolated VLAN is utilized for carrying traffic from said isolated port to said promiscuous port.

20. The shared service enabler of claim 12 wherein said promiscuous port is capable of serving a plurality of isolated VLANs.

21. The shared service enabler of claim 12 wherein said isolated port provides complete layer 2 separation from other isolated ports within the same said isolated VLAN, and provides complete layer 2 connectivity to any said promiscuous ports within the same said isolated VLAN.

22. The shared service enabler of claim 12 wherein all server resource traffic to said isolated port, except for traffic originating from said promiscuous port is blocked.

23. The computer-usable medium of claim 6 wherein said isolated port comprises:
  providing a complete layer 2 separation from other isolated ports within the same said isolated VLAN; and
  providing complete layer 2 connectivity to any said promiscuous ports within the same said isolated VLAN.

24. A utility computing environment comprising:
  a plurality of information technology (IT) compute resources and connections coupled with said plurality of IT compute resources, wherein said plurality of IT compute resources include at least one hardware resource and wherein each of said plurality of IT compute resources are represented in a machine-readable map;
  a management server coupled with said plurality of IT compute resources, said management server configured to enable the provisioning of a non-management shared service for a data center; and
  a primary virtual local area network (VLAN) generator for generating a primary VLAN for each account;
  a shared service request receiver for receiving a request from a service provider to provide a shared service to at least one server in the account context of said utility computing environment;
  a promiscuous port assigner for generating an isolated VLAN for at least one service being provisioned in the context of the account primary VLAN and assigning a promiscuous port for said service provider;
  a selection option provider for providing a selection option for said at least one server, said selection option for allowing said at least one server to select the shared service of said service provider; and
  an isolated VLAN assigner for assigning an isolated port on the said isolated VLAN for said at least one server when said server selects said shared service, wherein the at least one server utilizes said isolated port on said isolated VLAN for contacting said shared service.

25. The utility computing environment of claim 24 further comprising:
  a community port assigner for supporting high availability (HA) topology of service provider, by establishing a community VLAN and assigning community ports to heart-beat polling ports of HA configured service provider along with promiscuous ports to active-standby ports.

26. The utility computing environment of claim 24 further comprising:
  a network operations center from which a data center operator can operate.

* * * * *

UNITED STATES PATENT AND TRADEMARK OFFICE
CERTIFICATE OF CORRECTION

PATENT NO. : 8,908,708 B2  
APPLICATION NO. : 11/262434  
DATED : December 9, 2014  
INVENTOR(S) : Raikar Page 1 of 1

It is certified that error appears in the above-identified patent and that said Letters Patent is hereby corrected as shown below:

In the claims

Column 13, line 9, Claim 16, delete "method" and insert -- shared service enabler --, therefor.

Column 13, line 11, Claim 17, delete "method" and insert -- shared service enabler --, therefor.

Column 13, line 31, Claim 23, delete "computer-usable medium" and insert -- method --, therefor.

Signed and Sealed this  
Twenty-second Day of March, 2016

Michelle K. Lee  
*Director of the United States Patent and Trademark Office*